United States Patent [19]

Ebner et al.

[11] 3,975,589
[45] Aug. 17, 1976

[54] TRANSPONDER FOR TRANSMITTING DATA FROM DIGITAL ENCODING TRANSDUCERS OVER A TELEPHONE LINE

[75] Inventors: Theran L. Ebner; Donald W. Hawkins, both of Houston, Tex.

[73] Assignee: Houston Natural Gas Corporation, Houston, Tex.

[22] Filed: Apr. 7, 1975

[21] Appl. No.: 565,974

[52] U.S. Cl. ........................... 179/2 AM; 340/152 T
[51] Int. Cl.² ........................................ H04M 11/00
[58] Field of Search ..................... 179/2 A, 2 AM; 340/152 R, 152 T

[56] References Cited
UNITED STATES PATENTS
3,842,206    10/1974    Barsellotti et al. ................. 179/2 A

*Primary Examiner*—Kathleen H. Claffy
*Assistant Examiner*—George G. Stellar
*Attorney, Agent, or Firm*—Fulbright & Jaworski

[57] ABSTRACT

A transponder for connection to a telephone line for transmitting data over the telephone line from one or more measuring transducers to a data collection center having input means preventing interference with normal telephone use but recognizing an interrogating signal which activates the transponder. The transponder includes a modulator circuit for transmitting data by a plurality of different frequencies which is actuated by a frequency control circuit for controlling the frequency output of the modulator. A bit line strobe counter is connected to the measuring transducers and the frequency control circuit for obtaining bit line data, and a dial line strobe counter is connected to the measuring transducers for sequentially obtaining data from the transducer dials. A program timing means is connected to the modulator circuit, the frequency control circuit, and the strobe counters for synchronizing the timing of the transponder. Clock means are connected to the modulator, the frequency control circuit and the program timing for providing a common timing signal. The transponder responds to interrogation by transmitting serially encoded data using audio tones in the voice band.

10 Claims, 8 Drawing Figures

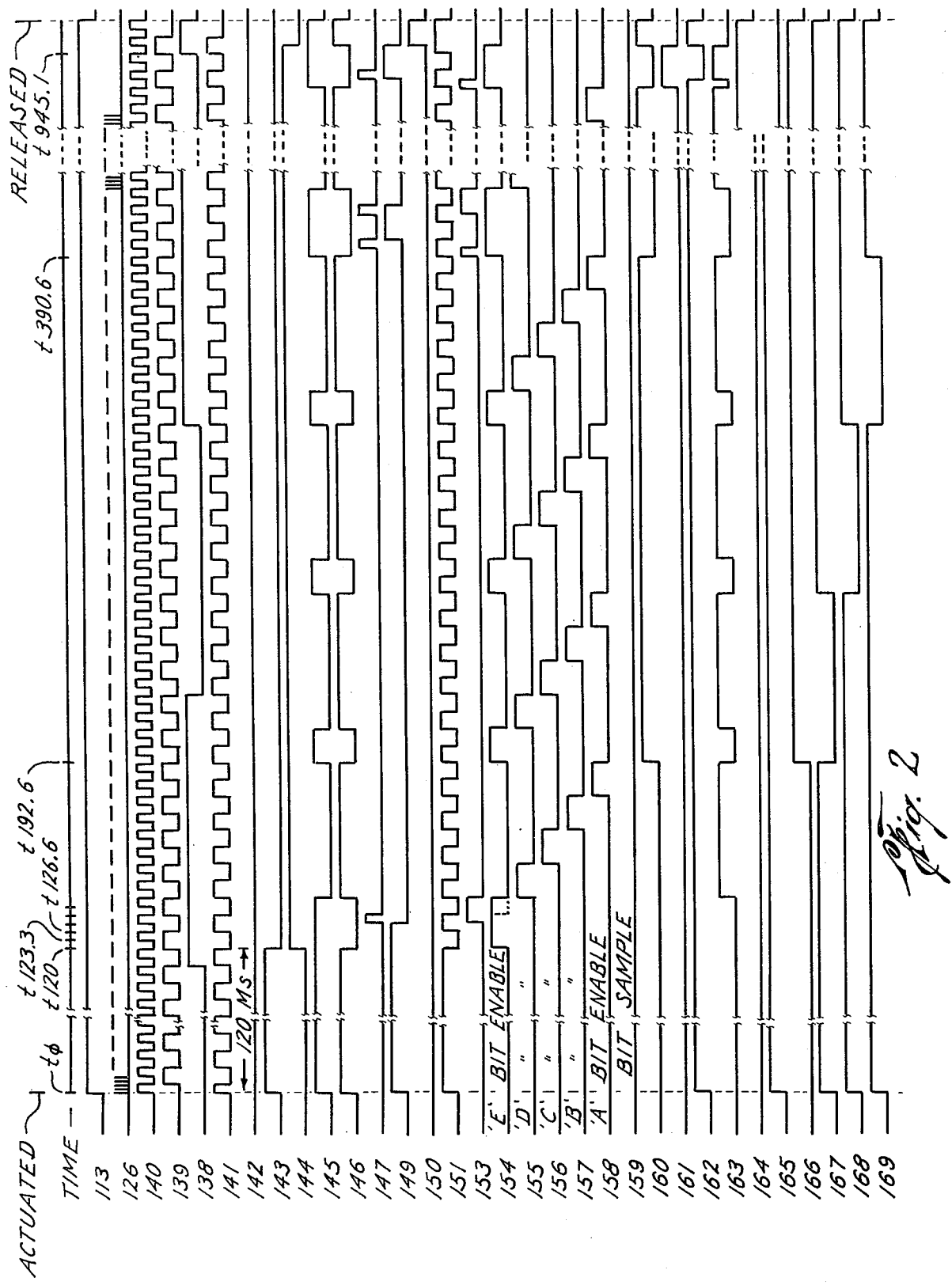

$f\phi$ = 2013 Hz
(REST FREQUENCY)

$fm$ = 1912.5 Hz
MARK FREQUENCY (BINARY 1)

$fs$ = 2125 Hz
SPACE FREQUENCY (BINARY 0)

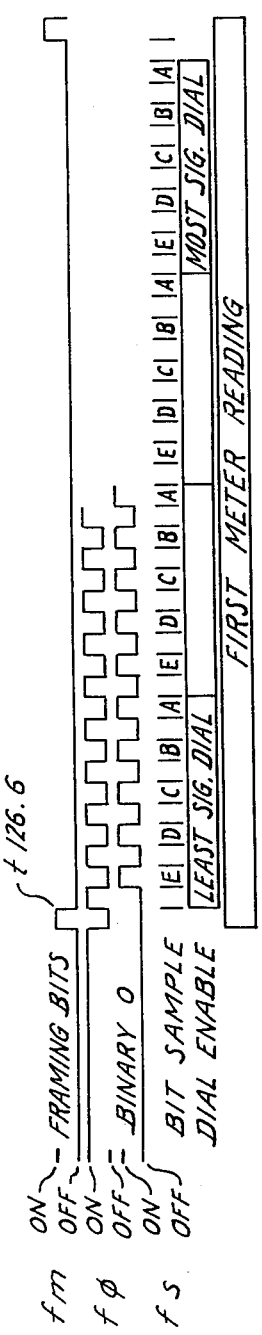
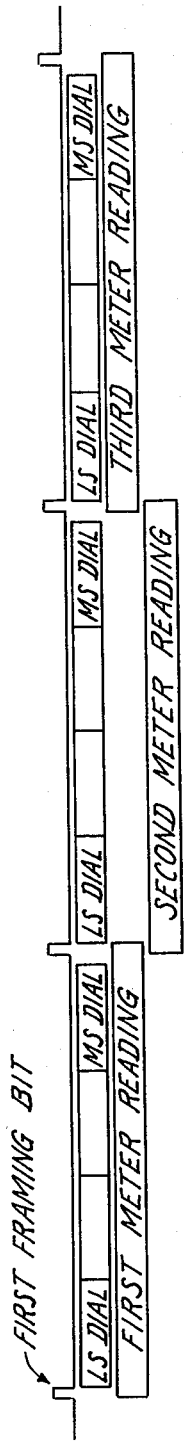
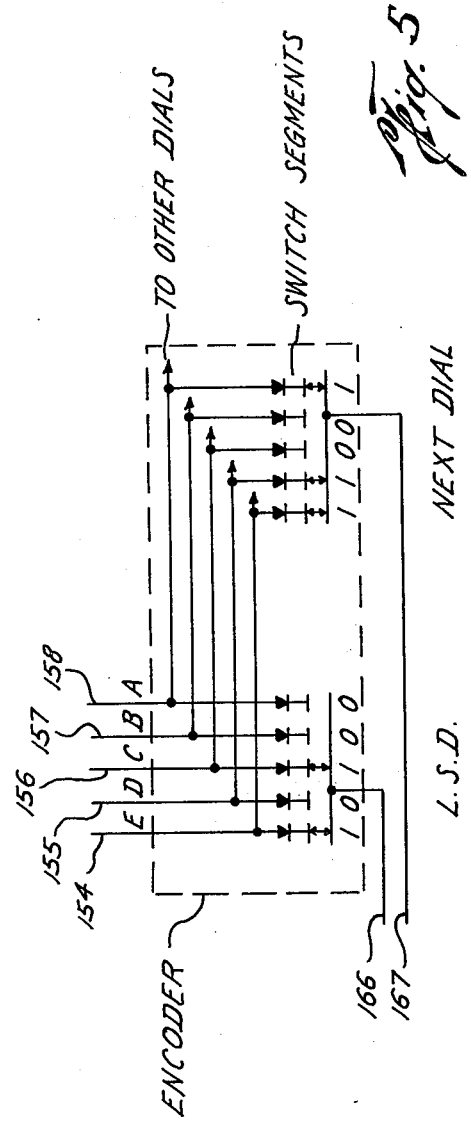

TRANSPONDER FOR TRANSMITTING DATA FROM DIGITAL ENCODING TRANSDUCERS OVER A TELEPHONE LINE

BACKGROUND OF THE INVENTION

Various types of digital encoding transducers, for example as shown in U.S. Pat. No. 3,683,368, are in use for a multitude of purposes in process control, research, marketing, public utility and consumer fields. For reasons of economy, safety, environmental, and conservation, it is desirable to obtain data from these transducers via a telephone network, particularly by public utilities measuring water, gas, and electricity consumption by a consumer.

The present invention generally relates to a transponder for transmission of data from digitally encoding transducers over the telephone network without interfering with the telephone service.

SUMMARY

The present invention relates to a transponder which may be connected directly to the tip and ring conductors of a telephone line and contains a D.C. alerted coupler, a multi-frequency modulator, a bit line strobe which may be connected to any number of transducers in parallel and a dial line strobe which is sequentially connected to one or more dial encoders.

Objects of the present invention are to provide a transponder which:

1. Does not degrade normal telephone subscriber service.
2. Is transparent to normal telephone company line tests.
3. Does not respond to nor affect normal subscriber line signalling.
4. May be interrogated from one or more data collection centers over metallic telephone line pairs ranging from 0 to more than 4,000 loop ohms in length.
5. Is powered from voltage applied to the telephone line during the interrogation interval and does not consume any power at other times.
6. Does not require special equipment at the serving central office.
7. Responds to interrogation by transmitting serially coded data using audio tones in the voice band.
8. Responds to interrogation by transmitting an encoded transducer reading beginning with the least significant digit and proceeding through the most significant digit. The first transducer reading is followed by subsequent transducer readings.
9. Is designed to operate on single party telephone lines which comprise 90% of the switched network in the U.S. where it is possible to utilize a D.C. interrogation pulse to significant economic advantage.
10. When interrogated, is controlled by a single-relatively high frequency clock which may be suitably scaled down to produce: (1) voice band modulator tones, (2) framing bit interval pulses, and (4) data word interval control for providing relative precision in timing and modulation without critical adjustment during manufacture.
11. Utilizes a matrix format of interconnection to its associated encoders to minimize interconnection wiring.
12. May be easily adapted for use on multi-party telephone lines.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 2 is the timing diagram illustrating signals referred to in the circuit description, FIG. 4A illustrates the organization of the data word for the first transducer or meter reading, FIG. 4B illustrates the organization of the complete data word, and FIG. 5 shows the manner in which an encoder is connected to the present invention.

BRIEF DESCRIPTION OF THE PREFERRED EMBODIMENT

For purposes of illustration only, the transponder of the present invention will be described in transmitting data from one or more digital encoding transducers, such as shown in U.S. Pat. No. 3,683,368, installed on one or more utility meters having encoded transducers or meters which are coded in a five bit code and are a four dial meter. In addition, the operation of the transponder will be described in conjunction with an ordinary subscriber telephone line having only a single party, it being understood that with the addition of a suitable digital filter circuit, it is possible to connect a plurality of transponders to a single transmission line pair so that the transponder is readily adaptable to multi-party subscriber line operations.

Figure 1:
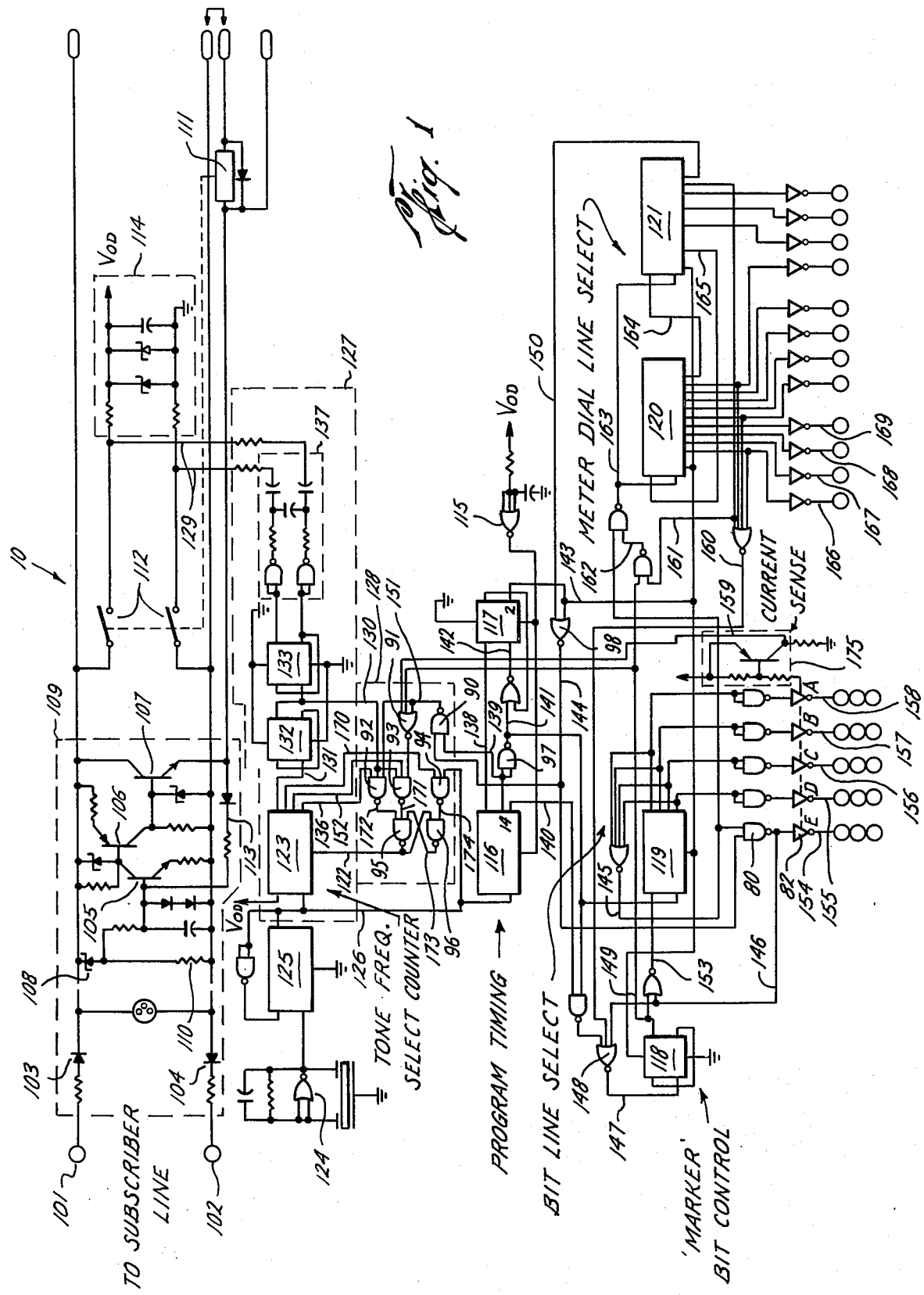
FIG. 1 is the schematic diagram of the preferred embodiment.

Referring now to FIG. 1, the transponder of the present invention is generally indicated by the reference numeral 10. An input or alert circuit 109 includes a line 101 which will be connected to the ring conductor and line 102 which will be connected to the tip conductor of an ordinary telephone subscriber single party line.

In the "on hook" idle state, a typical subscriber line has supervisory power connected to it at the telephone company central office so that the ring conductor is negative with respect to the tip conductor. Diodes 103 and 104 are provided which are back biased to prevent consumption of power by the transponder 10 from applied voltages of this polarity.

Other voltages which may normally appear on a telephone line in the opposite polarity, that is, ring conductor positive with respect to tip conductor, are (1) voltages from the test center, and (2) A.C. ringing voltage. It is desirable that the transponder 10 remain transparent to these voltages. Otherwise, the effect would be to degrade service or hamper normal testing and maintenance procedures.

The D.C. input or alert circuit 109 which includes constant current driver circuits 105 and 106 and a relay actuating circuit 107, is designed to exhibit a very high impedance to these voltage levels where the polarity of the line voltage is such that diodes 103 and 104 are forward biased.

A zener diode 108 establishes the threshold level for the D.C. alerting circuit 109. This threshold level is established at a voltage point (ring conductor positive, tip conductor negative) in excess of the maximum level of voltages which might be applied to the line under normal circumstances.

D.C. ALERTED COUPLER INPUT

The transponder 10 is activated during the interrogation cycle by applying a pulsed voltage (ring+, tip−) of the proper level to the telephone line. Diode 108 conducts and develops a voltage across a resistor 110 which turns driver circuit 105 on. Driver circuit 105 turns on driver circuit 106 which causes a relay actuating circuit 107 to conduct to actuate a relay 111 and close its contacts 112. Voltage is fed back from the emitter circuit of 107 through circuit 113 to driver circuit 105 to hold it on.

In practice, the voltage on the telephone line is reduced from the "activating" voltage level to a substantially lower "operating" voltage level shortly after relay 111 is actuated. Diode 108 ceases conducting due to the lower voltage level and the relay remains closed due to the action of circuit 113.

RESET

Relay contacts 112, when actuated, connect supply voltages to the logic circuits of the transponder 10 through regulator circuit 114. As power is applied, a reset generator 115 applies a reset pulse to a program timing counter 116 and a FLIP-FLOP 117.

Pin 2 of FLIP-FLOP 117 is forced high by the reset pulse and resets a FLIP-FLOP 118, which is a marker bit control, bit line strobe counter 119, and dial line counters 120 and 121. Pin 14 of program timing counter 116 is forced low by the reset pulse providing a signal 139 to the frequency control circuit 128 which includes NAND gate 90, NOR gate 91, NAND gates 92, 93, and 94, and a latch circuit consisting of NAND gates 95 and 96, which forces signal 122 to the logical high condition which forces the divider circuit 123 of the modulator circuit 127 to the zero condition. The effect of the reset pulses is to insure that the transponder 10 begins operation properly synchronized.

A clock oscillator 124 also begins operation when power is applied. For purposes of example, the clock frequency is chosen at 459 Khz nominally. Other frequencies may be used depending upon the desired bit rate and modulator frequencies. One feature of the transponder 10 is the use of a ceramic filter element oscillator as the clock 124 to generate clock pulses at a relatively high frequency, which when suitably divided, furnishes timing pulses for the bit strobe counter 119, meter dial select strobe counter 120 and modulator circuit 127. This approach simplifies the transponder circuitry, insures the relative precision timing and frequency control required by the system, eliminates the need for critical adjustment at assembly, and offers temperature stability difficult and expensive to achieve with more conventional L-C type modulators.

A frequency divider 125 may be provided to divide the 459Khz output of clock oscillator 124 by a factor of 6 so that signal 126 is 76.5 Khz.

Signal 126 from divider 125 drives modulator circuit 127, program timing counter 116 and is used as a synchronizing signal for the frequency control circuit 128.

MODULATOR CIRCUIT

Another feature of the transponder 10 is the manner in which signalling tones are produced and the eliminating of envelope distortion by the unique manner in which frequency control or keying — that is — switching from one frequency to another is implemented. The synchronous relationship established between the modulator 127 and its frequency control circuit 128 by the use of a common signal source allows instantaneous adjustment of the length of the particular half cycle of tone being transmitted at the time to the desired frequency. This results in a tone burst envelope which is square and does not exhibit distortion resulting from keying such as that experienced in the usual L-C type circuits for example. In other words, rise and delay times in the amplitude are eliminated. An additional feature is the elimination of harmonic distortion such as that experienced when shifting frequency in an L-C type oscillator by switching capacitance or inductance.

The data stream generated by the transponder 10 may be of any suitable type and for purposes of illustration may be of the linear FM return to zero format consisting of three voice band frequency tones. For purposes of illustration, the data binary zero bit is transmitted as a 2125 Hz tone. The data binary one bit is transmitted as a 1912.5 Hz tone. The rest or center frequency bit is transmitted as a 2013 Hz tone. In practice, any three frequencies could be used which are suitably related so that division by typical dividing circuits is practical.

Signal 126 at 76.5 Khz, when divided by factors of 36, 38 or 40 in the modulator circuit 127, produces the frequencies 2125, 2013 and 1912.5 Hz respectively with a minimum of circuitry.

Returning now to the point in the interrogation sequence where relay 111 has been actuated; reset generator 115 has reset the strobes 119, 120, 121 of the transponder and signal 126 has been applied to the modulator circuit 127.

Divider circuit 123 is arranged to divide signal 126 by a basic factor of ten at all times and thereafter divide it additionally by a factor of either 9, 10, or 8, depending upon instruction signals received from the frequency control circuit 128. The resulting division ratio is either 18, 20, or 19 under control of circuit 128. The modulator 127 also includes FLIP-FLOPS 132 and 133. FLIP-FLOP 133 further divides the ratios by a factor of two to provide the factors of 36, 40 and 38.

REST FREQUENCY TONE

Figure 3A:
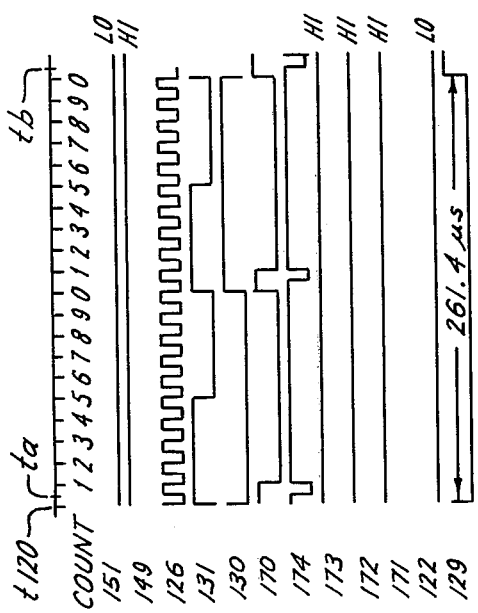
FIG. 3A illustrates timing signals associated with the modulator circuit when it is transmitting a rest frequency tone.

Referring to FIGS. 2 and 3A, our exemplary sequence begins at the point indicated $t\phi$.

Upon resetting, signal 151 is in the high condition. Signal 151 is essentially the modulator control signal and in the high condition inhibits NAND gate 92 causing signal 171 to be low. Signal 151 also enables NAND gate 93 thereby causing the modulator 127 to deliver a rest frequency tone at lines 129.

Referring now to FIG. 3A, signal 122 from frequency control circuit 128 is high and signal 170 from counter 123 is low and beginning the first half cycle of the modulator output.

Signal 174 is high. As clock signal 126 switches high for the first time at $ta$, 174 switches low resetting the latch circuit consisting of NAND gates 95 and 96. The output of the latch circuit, signal 122, switches low removing the inhibit signal from counter 123.

At the next negative transition of 126, counter 123 advances to a count of 1 and signal 170 switches low. Counter 123 continues to count negative transitions of 126 until it reaches a count of 9 where signal 136 switches high.

Signal 136 is connected to gate 92, however, at this point in the sequence, gate 92 is inhibited by signal 130 being low and signal 136 has no effect.

Counter 123 advances to a count of 10. Signal 136 switches low and signal 170 switches high and signal 130 switches high. On the next position transition of 126, Signal 174 from gate 94 switches low. The latch circuit is still reeset, however, so that 174 low has no effect.

Signal 131 from counter 133 switches high, causing FLIP-FLOP 132 to switch to the set condition and signal 130 therefore switches high.

As counter 123 advances to a count of 1 for the second time, signal 170 switches low, allowing signal 174 to return to the high condition. Counter 123 continues to count until it reaches a count of 9 for the second time, having now counted to 19. Signal 136 switches high. NAND gate 92 inputs 136, 130 and 151 are now all high and 172 switches low, setting the latch circuit of gates 95 and 96, which switches signal 122 high. Signal 122 high resets counter 123 to zero count where signal 131 switches high. Signal 131 switching high causes FLIP-FLOP 132 to switch and signal 130 switches low. Signal 130 switching low causes FLIP-FLOP 133 to switch which terminates the first half cycle of modulator output signal 129.

The length of the 129 half cycle is 248 μs for the signal 126 frequency illustrated which is equivalent to the rest frequency $f\phi$ of 2013 Hz.

On the next positive transition of 126 shown at tb in FIG. 3A, signal 174 switches low and signal 173 switches high, resetting the latch so that 122 switches low. Counter 123 begins another count cycle to 10.

The above described circuit action continues so long as signal 151 remains high.

Referring now to FIGS. 1 and 2, program timing counter 116 began counting signal 126 pulses at $t\phi$ also and at $t120$ has reached a count of $2^{14}$ or 16,384 where signal 138 switches high.

A signal 138 high causes signal 151 to switch low, thus changing the modulus of modulator circuit 128. Note that the modulator has transmitted the 2013 Hz rest frequency tone during the interval from $t\phi$ through $t120$.

The output of FLIP-FLOP 133 is a symmetrical square wave which is an undesirable wave form for transmission via the switched telephone network. A low pass filter circuit 137 in the output 129 serves to shape the signal to a wave form having harmonic content sufficiently low to meet existing specifications for acceptable wave forms to be transmitted via the switched telephone network.

MARK FREQUENCY TONE

Signal 151 low enables 135 and inhibits gate 92 so that the modulator may respond to signals 152, 149, or 159.

Signal 159 has the same effect upon the modulator circuit as signal 149; however, it occurs later in our exemplary sequence and therefore will be referred to later.

Figure 3B:
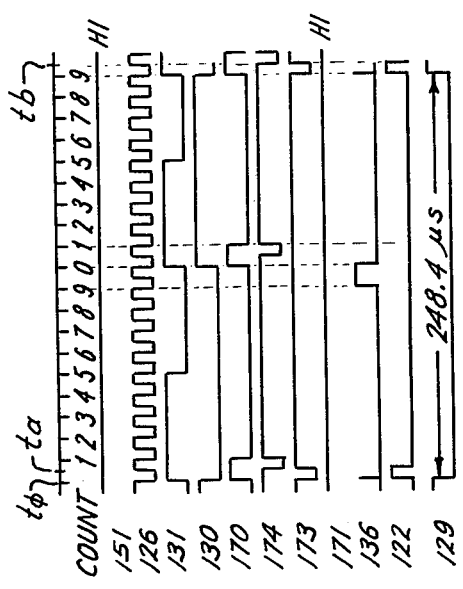
FIG. 3B illustrates signals associated with the modulator circuit when it is transmitting a mark frequency tone (binary 1)

Referring to FIGS. 1, 2 and 3B and beginning at point $t120$, signal 151 is low and signal 149 is high.

Signal 149 high from marker bit control FLIP-FLOP 118 inhibits gate 93 through Nor gate 91. Since signal 151 low inhibits gate 92, the modulator cannot respond to signals 136 and 152. Signal 170 therefore becomes the controlling signal. Signal 170 and signal 126 combine to produce signal 174, the latch reset signal, and therefore serve only to assure phase synchronizing between signal 126 and signal 129 at the present point in our exemplary sequence.

In the absence of signals 136 and 152, the modulator 127 divides signal 126 by a factor of 20 so that the half cycle length of output 129 is 261.8 μs, equivalent to our mark frequency fm of 1912.5 Hz.

Modulator 128 continues to operate in this manner until $t126.6$ where signal 151 again switches high. The result is the transmission of a 6.6 Ms bit of fm tone immediately following the $f\phi$ tone transmitted from $t\phi$ to $t120$. This bit is referred to as the framing or marker bit and is transmitted by the modulator in response to signal 149 a total of four times during the interrogation cycle as shown in FIGS. 4A and 4B.

The mark frequency is characterized as a binary 1. A binary 1 bit is produced during the data word when signal 159 is high which is discussed later.

SPACE FREQUENCY TONE

The third tone frequency which the modulator is designed to transmit is the space frequency $fs$ tone of 2125 Hz corresponding to the binary zero condition in the data word.

Figure 3C:
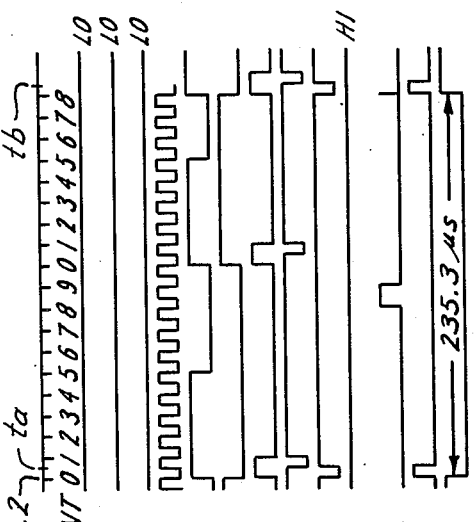
FIG. 3C illustrates signals associated with the modulator circuit when it is transmitting a space frequency tone (binary $\phi$)

A signal 159 low programs the modulator 127 to divide signal 126 by a factor of 18 to produce this tone as shown in FIG. 3C.

The first time that a space frequency tone may occur is at $t133.2$. At this point, assume that signal 122 is high and thus counter 123 is held reset to zero count. At point $ta$, as before, when signal 126 switches high, signal 174 switches low and resets the latch circuit of gates 95 and 96.

Counter 123 counts until it reaches a count of 8 where signal 152 switches high. At this time, signal 152 has no effect because gate 93 is inhibited by signal 130 low. Counter 123 then advances to a count of 9 where signal 136 switches high. Signal 136 has no effect since signal 130 low also inhibits gate 92 in addition to 151 low inhibiting its response. Counter 123 therefore advances to a count of 10. Signal 130 switches high. Counter 123 begins another count cycle and continues to count until it reaches a count of 8 where 152 again switches high. Signal 152 and signal 130 high cause signal 171 to switch low. Signal 171 low sets the latch circuit which switches signal 122 high. As before, a signal 122 high resets counter 123 to zero count and signal 131 switches high. FLIP-FLOP 132 switches and FLIP-FLOP 133 switches in response to signal 130 so that output 129 switches high, thus ending the first half cycle of space frequency tone.

The effect produced is to divide signal 126 by a factor of 18 so that the 129 pulse length is 235.3 μs which is equivalent to 2,125 Hz. The modulator 127 continues to operate in this manner until signal switches high at $t139.8$. The data zero bit is therefore 6.6 Ms long.

The modulator circuit 127 is controlled by signals 151, 149 and 159 in a manner which insures that it is keyed or switched from the mark or space frequency to the rest frequency or from the rest frequency to the mark or space frequency. A rest frequency pulse always appears between mark or space frequency data bits.

Since the nominal bit length of 6.6 Ms bears no synchronous relationship to the modulator output tone frequencies, signal 151 may program the modulator to switch to *fφ*, for example, during the time that it is delivering an *fm* output and before the completion of an *fm* tone cycle. In this instance, signal 159 would be controlling the modulator 127 to divide by a factor of 20. Signal 151 switching high would override signal 159 by enabling gate 92. As the modulator 127 reached a count of 19, the latch circuit would be "set" and the cycle in progress would be terminated.

In another instance where the modulator is delivering an fs tone output, it would be dividing by a factor of 18 with gate 93 enabled by signals 151, 149 and 159 all low. Signal 151 switching high before counter 123 reaches a count of 18 will override signal 159 and cause it to continue to a count of 19.

Note that in both of these instances, the output frequency of the modulator has been instantly changed to *fφ* without producing a spurious transitional frequency and without an impedance change which would produce amplitude distortion.

In the third instance where the modulator 127 is delivering an *fφ* tone output, it is programmed to divide by 19 by signal 151 high. As signal 151 switches low at the end of the *fφ* bit, signal 149 or 159 may be high, for example, calling for an *fm* tone. In this instance, counter 123 would simply continue on to a count of 20, thereby converting the last half cycle of *fφ* tone to an *fm* tone as called for by signal 159.

Similarly, signals 149 and 159 may be both low when signal 151 switches low. In this instance, an fs tone is called for and counter 123 will switch to a division ratio of 18.

The novel characteristics of the modulator circuit 127 has a significant advantage over more conventional circuits due to the inherent absence of amplitude distortion and spurious frequencies resulting from keying.

BIT LINE STROBE

Program timing counter 116 is a divide by $2^{14}$ counter which serves as the clock generator for the data portion of the interrogation cycle. Three output signals 138($2^{14}$), 139($2^{10}$), and 140($2^9$) are taken from 116 to control the strobe circuits. Signals 139 and 140 occur first, but perform no function at this time.

Returning now to our exemplary sequence, counter 116 began to receive clock pulses 126 at the time oscillator 124 started at *tφ* with reference to FIG. 2. When 116 reaches a count of $2^{14}$, signal 138 switches high and enables FLIP-FLOP 117. This occurs at *t*113.3.

As counter 116 continues to count, signal 139 switches high at *t*120 causing signal 141 from NAND gate 97 to switch low. A signal 141 low allows signal 142 from NOR gate to switch high. Signal 142 switching high switches FLIP-FLOP 117 to the "set" condition.

FLIP-FLOP 117 in the "set" condition switches signal 143 low and since signal 150 is low at this time, signal 144 from NOR gate 98 switches high. Signal 142 is forced low by "117 set" thus inhibiting FLIP-FLOP 117 from responding to subsequent 138 pulses.

Signal 144 high and signal 139 high cause signal 151 from gate 90 to switch low.

Signal 151 low enables the frequency control circuit 128 to respond to signal 149 which is high. The modulator output 129 switches from *fφ* to *fm* and starts transmitting the first framing bit of the data word. The framing bit is terminated at *t*126.6 when signal 151 switches high and causes the modulator 127 to switch to an *fφ* bit again.

FIG. 4B illustrates the organization of the complete data word beginning with the first framing bit. Note that a framing bit precedes and follows each meter reading. Note also that each meter reading begins with the least significant dial and ends with the most significant dial.

FIG. 4A illustrates details of the first meter reading. The second and third meter readings are identical to the first. Note that each meter reading cycle, which has four dials, consists of 20 data bits, that is, 4 cycles of E-D-C-B-A bit samples — one for each dial. Note also that an *fφ* bit occurs between each data bit so that the data word for one meter reading consists of a total of 43 bits including the two framing bits.

The data word illustrated in FIG. 4A will be transmitted by the transponder 10 when it is interrogated and is not connected to an encoder. The effect of an encoder will be described later.

Returning now to our exemplary sequence and referring jointly to FIGS. 1, 2 and 4A, we have reached point *t*126.6. Signals 145 and 144 are high so that signal 146 from gate 80 is low. Signal 154 from inverter 82 is high, enabling the E bit line.

In the interval *t*126.6–*t*133.2 signal 151 is high and requires the modulator 127 to transmit an *fφ* bit. At *t*133.2 signal 151 swings low, however, and the modulator 127 responds to signal 159. Since signal 154 is high, signal 159 remains low, corresponding to the binary φ condition (no current flow). The modulator 127 responds by transmitting an *fs* tone until *t*139.8 when signal 151 switches high and *fφ* is called for again.

At *t*129.9 signal 146 was low. Signal 160 was low. Signal 141 was high and as signal 140 switched, high, signal 147 switched high, causing signal 149 to switch low.

At *t*139.8, signals 149 and 146 both low allow signal 153 to be high. As signal 141 switches high, bit strobe counter or register 119 stores signal 153 in its first position, causing signal 155 to switch high. Signal 145 switches low causing signal 146 to switch high. Signal 153 switches low and removes the input from bit strobe counter 119. Signal 146 high causes signal 154 to switch low. The D bit line is enabled by signal 155.

Similar action occurs each time signal 141 switches high and the bit placed in bit strobe register 119 by signal 153 is shifted through and sequentially enables each bit line 154, 155, 156, 157 and 158 or E-D-C-B-A, respectively.

The phase of signal 151 is such that the leading-edge-half of each bit line enabled period is used to transmit an *fφ* bit while the trailing-edge-half is used to sample the bit line for the binary condition and transmit a tone *fm* for a binary 1 or *fs* for binary φ. The bit line strobe 119 sequentially enables the bit lines 154, 155, 156, 157 and 158 for four complete cycles before a change in its operation occurs.

DIAL LINE STROBE

During the first bit strobe cycle from *t*126.6 to *t*192.6, signal 166 is low and enables the least significant dial of the first meter to be read.

At *t*192.6, signal 149 is low. Signal 162 is therefore high. Signal 145 switches high, causing signal 163 to switch low and advance dial strobe counter 120 to a count of one. Signal 167 switches low and enables the second dial of the meter to be read. Each time the bit strobe 119 completes a cycle, it advances the dial strobe 120 to the next dial to be read until all four dials have been read.

When the fourth dial has been read at *t*277.2, counter 120 is advanced to a count of five which causes signal 160 to switch low. Signal 160 switching low causes signal 147 to switch high. Signal 147 switching high sets FLIP-FLOP 118, causing signal 149 to switch high. Signal 149 high enables gate 93, requesting an fm bit from the modulator 127. Signal 151 is high, however, and inhibits the modulator 127 until it has completed transmitting an $f\phi$ bit. As signal 151 switches low at *t*393.9, the modulator 127 responds to signal 149 and transmits the *fm* bit which is the second framing bit of the data word.

The transponder continues to strobe the bit lines 154, 155, 156, 157 and 158 and advance the dial counter 120 and 121 until it has read all 12 dials and transmitted the fourth and final framing bit which is completed at *t*945.1 where signal 151 switches high and causes an $f\phi$ tone.

Signal 150 is high so that signal 144 is low. Signal 144 low causes signal 151 to stop in the high condition. The transponder continues to send an $f\phi$ tone, uninterrupted until power is removed from terminals 101 and 102 and the transponder stops operation.

The foregoing description analyzes the operation of the transponder without an encoder connected to it. As disclosed in this analysis, signal 159 remained low throughout the interrogation period.

FIG. 5 illustrates the essential features of an encoder connected to the transponder in order to facilitate a better understanding of the bit strobe 119, dial strobe 120 and signal 159.

During the interval *t*120–*t*192.6, signal 166 is low. As 154–158 are sequentially enabled (switched high) it can be seen that 154 and 156 would exhibit low resistance and allow current flow while 155, 157 and 158 are not connected to 166 and therefore would not. The strobe cycle would therefore generate a binary sequence 10100.

Current sense circuit 175 is the common source for current to the bit lines 154, 155, 156, 157 and 158. Current flow causes signal 159 to switch high and modulator circuit 128 responds to 159 high by generating an *fm* bit.

Upon completion of the first bit strobe cycle, signal 166 switches high and signal 167 switches low. As the bit lines are strobed again, the binary sequence 11001 will be generated.

The present invention, therefore, is well adapted to carry out the objects and attain the ends and advantages mentioned as well as others inherent therein. While a presently preferred embodiment of the invention has been given for the purpose of disclosure, numerous changes may be made without departing from the spirit and scope of the invention as hereinafter claimed.

What is claimed is:

1. A transponder for connection to a telephone subscriber line for transmitting data over the telephone line from one or more measuring transducers to a data collection center comprising,
    an input means having means preventing interference with telephone use,
    means electrically connected to the input recognizing an interrogating signal for activating the transponder,
    modulator circuit means connected to the input for transmitting data by providing a plurality of different frequencies,
    a frequency control circuit connected to the modulator circuit for controlling the frequency output of the modulator,
    bit line strobe counter means connected to said measuring transducers and said frequency control circuit for obtaining bit line data,
    dial line strobe counter means connected to the bit line strobe counter means and to the measuring transducers for obtaining data from the measuring transducers,
    a program timing means connected to the modulator circuit, the frequency control circuit, the bit line strobe counter, the dial line strobe counter for controlling the timing of the transponder, and
    clock means connected to the modulator, the frequency control circuit, and the program timing means for providing common timing signals.

2. The apparatus of claim 1 including,
    waveform shaping means connected between the modulator circuit and the input for shaping the modulator signals for transmission through the telephone network.

3. The apparatus of claim 1 wherein modulator circuit includes means for dividing the timing signal to the modulator for obtaining square wave voice frequencies.

4. The apparatus of claim 3 wherein the modulator circuit and frequency control circuit switch the output of the modulator from one output frequency to another output frequency without affecting the output amplitude thereby avoiding spurious transitional frequencies.

5. The apparatus of claim 1 wherein the clock means includes a ceramic filter oscillator.

6. The apparatus of claim 1 wherein the input means receives operating power from the telephone line.

7. The apparatus of claim 6 wherein the means recognizing an interrogating signal includes means preventing consumption of power until interrogated.

8. The apparatus of claim 1 wherein the modulator circuit includes counting means and frequency control circuit is a logic circuit.

9. The apparatus of claim 3 wherein the modulator circuit includes means providing three different frequencies which are integrally related to the timing signal to the modulator.

10. The apparatus of claim 1 wherein the means recognizing an interrogating signal is a constant current device.

* * * * *